United States Patent [19]

Roney, IV et al.

[11] Patent Number: 5,222,251
[45] Date of Patent: Jun. 22, 1993

[54] METHOD FOR ELIMINATING ACOUSTIC ECHO IN A COMMUNICATION DEVICE

[75] Inventors: Edward M. Roney, IV, Grayslake; Bryan A. Potratz, Glendale Heights, both of Ill.

[73] Assignee: Motorola, Inc., Schaumburg, Ill.

[21] Appl. No.: 873,841

[22] Filed: Apr. 27, 1992

[51] Int. Cl.⁵ .............................................. H04B 7/015
[52] U.S. Cl. .................................. 455/54.1; 455/50.1; 455/67.3; 455/296; 379/392; 379/410
[58] Field of Search ......................... 455/54.1, 50.1, 63, 455/67.3, 295, 296; 379/388, 390, 392, 408, 410

[56] References Cited

U.S. PATENT DOCUMENTS 4,829,523  4/1989  Bretl ......................................... 455/63
4,843,621  6/1989  Potratz ................................. 379/390

OTHER PUBLICATIONS

K. Pohlmann, Principles of Digital Audio, 1985, pp. 69,72.

Primary Examiner—Reinhard J. Eisenzopf
Assistant Examiner—Philip Sobutka
Attorney, Agent, or Firm—Kenneth W. Bolvin

[57] ABSTRACT

The process of the present invention operates on the voice codewords transmitted in a digital cellular radiotelephone environment. The process first determines if a voice is active (201) on the communications path from the base station to the radiotelephone. If a voice is present, a threshold is calculated (202). Any signals on the reverse path from the radiotelephone to the base station that are below this threshold (203) are replaced by noise that is at the same level as the ambient noise (204).

3 Claims, 2 Drawing Sheets

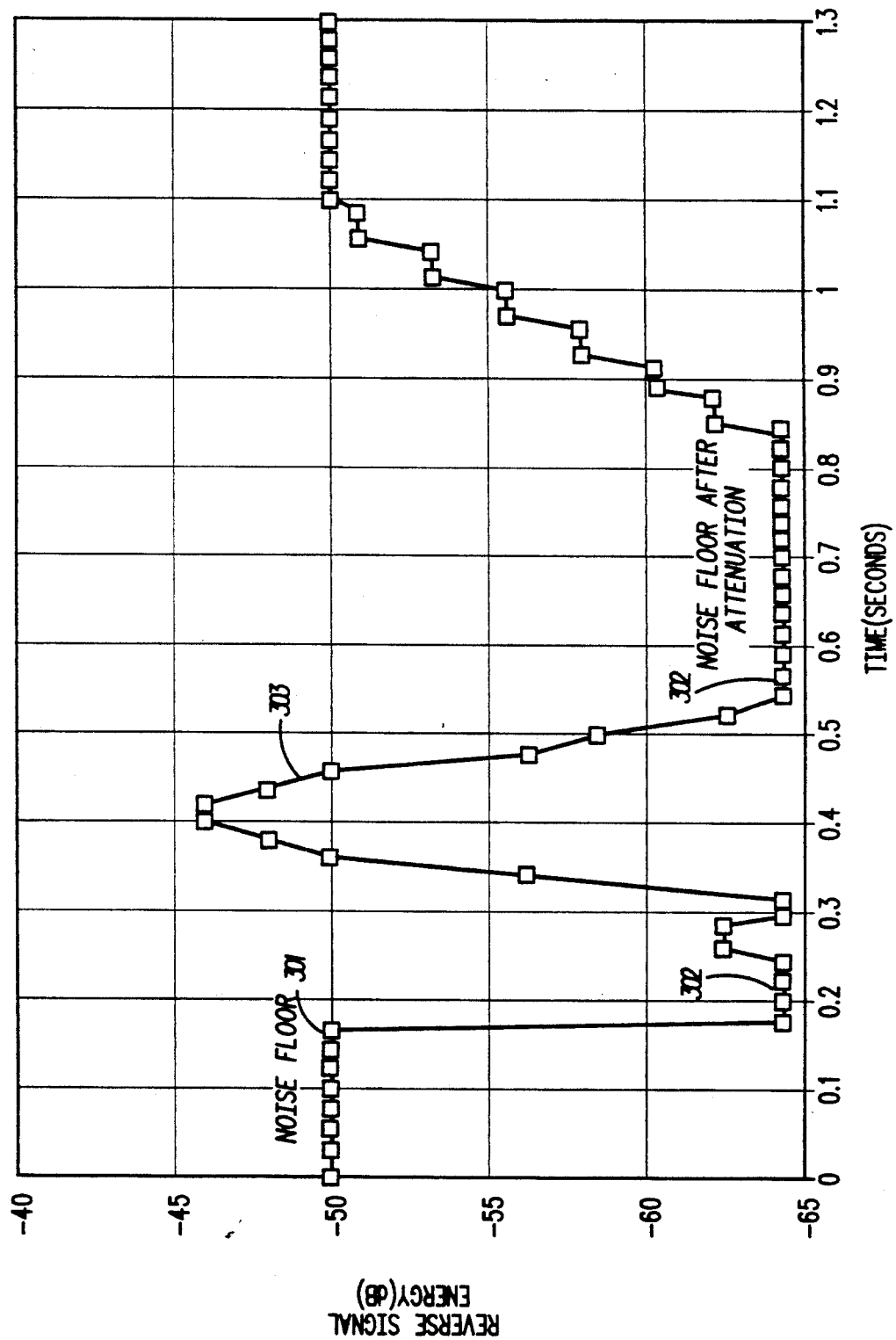

METHOD FOR ELIMINATING ACOUSTIC ECHO IN A COMMUNICATION DEVICE

FIELD OF THE INVENTION

The present invention relates generally to the field of communications and particularly to acoustic echo elimination in a hands-free communication device.

BACKGROUND OF THE INVENTION

The cellular radiotelephone system uses numerous antennas located throughout a metropolitan region. Each antenna is typically at the center of th a cell that is divided into six 60° sectors. Each sector has a group of frequencies that are transmitted at low power in order to communicate with mobile or portable radiotelephone that are within the sector. When the radiotelephone moves from one sector to another, the frequency being used is automatically switched, allowing the telephone call to continue uninterrupted. This permits a radiotelephone user to remain in contact with the landline telephone system anytime the radiotelephone is within range of a cellular radiotelephone system.

The popularity of this type of communication has caused some cities to experience an overload of radiotelephone calls. There are times when all frequencies are being used and additional users must wait to access the system until a frequency is free. This has led the cellular industry to develop a new generation digital cellular radiotelephone system using time division multiple access (TDMA) to replace the current analog system.

The TDMA system divides each frequency into times-lots, thus allowing a number of radiotelephones to use a frequency simultaneously. The DTMA system, therefore, greatly expands the number of radiotelephone that can use the radiotelephone system.

Mobile radiotelephones can be used with a handset or in a hands-free mode. The handset has a microphone and speaker and is held close to the face to communicate. In a TDMA system, the microphone is typically connected indirectly to a vocoder that converts the analog voice signal into codewords that are a quantized parameter representation of the speech signal.

Hands-free operation allows the user to communicate a short distance from a microphone and speaker without holding a handset. For proper hands-free operation, the microphone audio must be attenuated when the speaker is operating. This reduces the speaker audio that is receioved by the microphone and transmitted back to the person speaking at the other end of the call. Without the attenuation, the person on the landline end of the call would experience an acoustic echo of their own voice. This echo is delayed by the time it takes for the voice signal to travel through the system and return to the originator.

Depending on the volume of the speaker audio, the attenuation may not be enough to remove the acoustic echo. Radiotelephone systems, therefore, may have an acoustic echo canceller to remove more of the echo. Again, depending on the speaker audio volume, even this may leave enough of the echo to be detectable. There is a resulting need for a method to completely eliminate the acoustic echo.

SUMMARY OF THE INVENTION

The method for acoustic echo elimination of the present invention can be used in a hands-free communication device that communicates with other communication devices or a base station. The communication device having a forward communications path from the base station to the hands-free communication device and a reverse communication path from the hands-free communication device to the base station. The method first determines if an acoustic echo is active on the reverse communications path. If the echo is present, it is replaced with noise.

In one embodiment of the present invention, the handsfree communication device is a cellular radiotelephone. The radiotelephone communicates with a base station that is coupled to the landline telephone network.

BRIEF DESCRIPTION OF THE DRAWINGS

FIG. 3 shows a graph of an acoustic echo after processing by a typical radiotelephone echo canceller.

DETAILED DESCRIPTION OF THE PREFERRED EMBODIMENT

Figure 2:
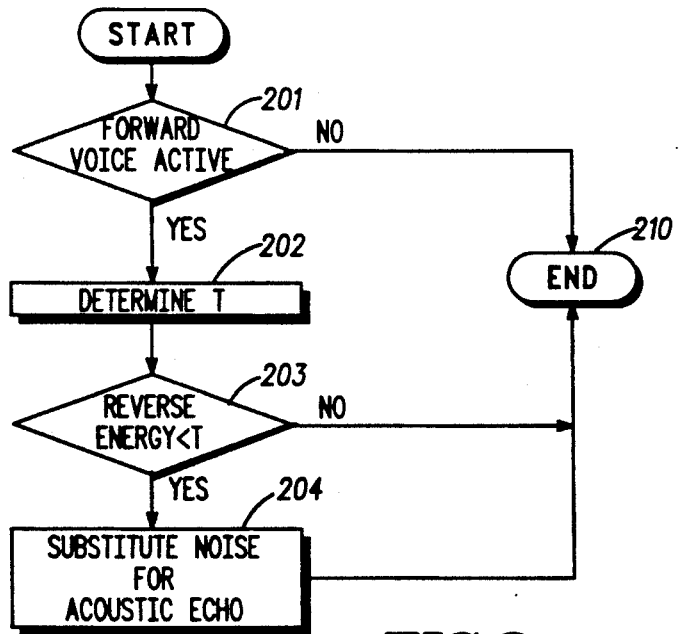
FIG. 2 shows a flowchart of the process of the present invention.

The acoustic echo elimination process of the present invention is illustrated in FIG. 2. This process is used in a mobile hands-free radiotelephone that opeates in the digital cellular radiotelephone environment. By replacing acoustic echoes with noise, the process eliminates any acoustic echoes that might disrupt communications between the radiotelephone and the landline or other radiotelephone users. This process operates on the speech codewords that are transmitted and not an analog signal. The speech codewords are generated by a speech coder.

Figure 1:
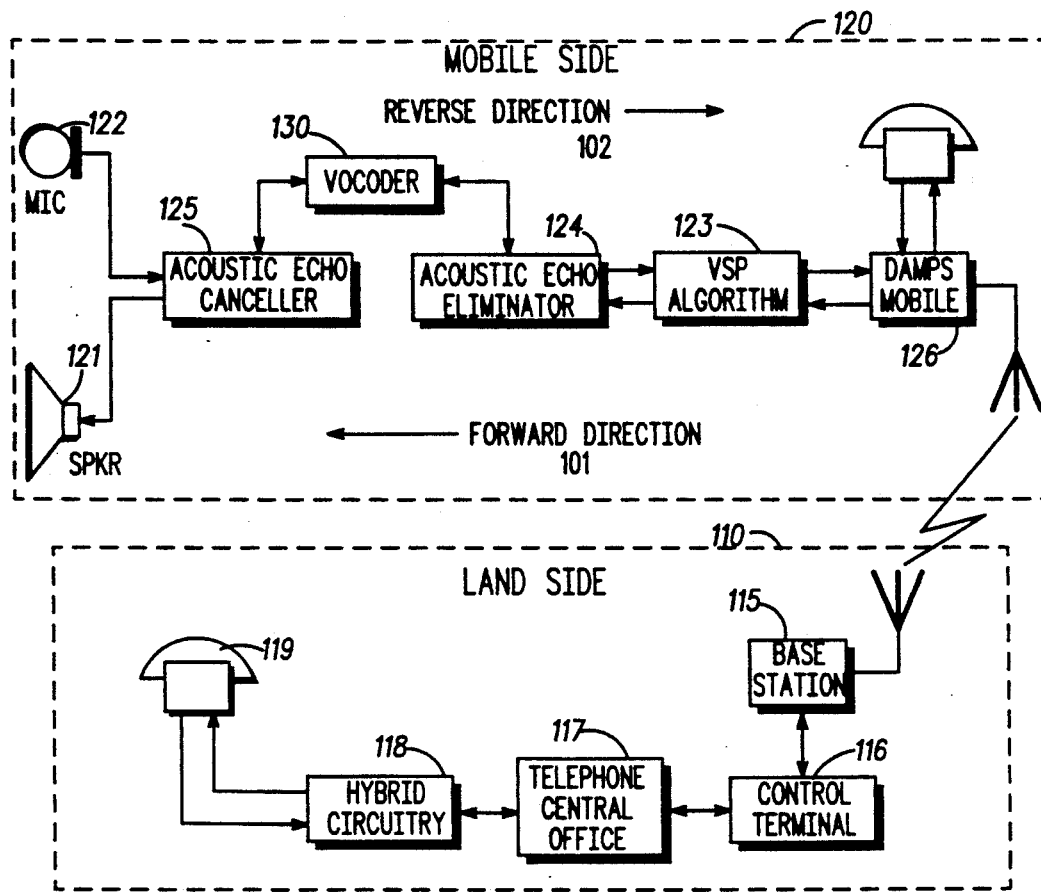
FIG. 1 shows a hands-free radiotelephone system in accordance with the present invention.

FIG. 1 illustrates a typical radiotelehpone system that implements the process of the present invention. The mobile side contains the hands-free microphone (122) and speaker (121) that are coupled to the mobile transceiver (126) through an acoustic echo canceller (125), a vocoder (130), the acoustic eliminator process of the present invention (123), and a hands-free attenuator (124).

The landline side (110) of the system is comprised of the base station (115) that communicates directly with the radiotelephone (120), the base station control terminal (116), the landline telephone switching office (117), and the interface circuitry (118) that interfaces the switching office (117) to the landline telephone (119).

The process begins by checking the forward communication path for a voice signal (201). The forward communication path (101) as well as the reverse communication path (102) are illustrated in FIG. 1. The forward path (101) is the direction of the signal from the landline side (110) to the radiotelephone (120). The reverse path is the direction from the radiotelephone (120) to the landline side (110).

If there is no voice activity on the forward path (101), the process ends (210). Since there is no voice activity on the path, the speaker (121) will not bea ctive, the microphone (122) will not pick up a voice signal from the speaker (121), and therefore no coustic echo is present.

If there is voice activity detected in the forward direction, a threshold must be found for determining the presence of acoustic echo (202). Any signal below this threshold is considered an acoustic echo.

The threshold is calculated by the following equation:

Threshold = $D - A_s - A_c$ (dB)

where:

D is the dynamic range of the audio signal (dB);

$A_s$ is the attenuation from the speaker to the microphone (dB); and $A_c$ is the attenuation due to the echo canceller (dB). This equation places the threshold at the highest point of the echo, thus preventing the clipping of any voice signal that is not an echo.

This is illustrated in FIG. 3. The noise floor, which is the level of the ambient noise surrounding the radiotelephone, is at 50 dB. This floor is attenuated (302) by the normal attenuation process (124) of the radiotelephone. An acoustic echo that escapes this attenuation (303) is illustrated as appearing between 0.3 and 0.5 second and rising above the noise floor (301).

The process of the present invention next determines if the energy on the reverse communications path is less than the threshold (203). If the echo goes above the threshold, the process ends (210) since replacing this signal might result in clipping a non-echo voice signal. If the echo is less than the threshold, noise is substituted for the echo (204).

The term noise, as it is used in this invention, is a general term identifying speech codewords representing the statistics of the current noise floor. The statistics for the current noise floor is the energy and spectral content of the current noise. These codewords representing noise are substituted in place of the acoustic echo codewords.

The noise that is substituted is at the same level as the noise floor. This has the effect of eliminating the annoying acoustic echo that would be heard by the landline telephone user. The consistent background noise of the radiotelephone's environment would be heard in its place.

We claim:

1. A method for acoustic echo elimination in a hands-free communication device, the communication device communicating with a base station and having a forward communications path from the base station to the communication device and a reverse communications path from the communication device to the base station, the method comprising the steps of:
   determining if an acoustic echo is active on the reverse communications path; and
   replacing the acoustic echo with at least one codeword, generated by the communication device, that represents an energy and spectral content of ambient noise.

2. A method for acoustic echo elimination in a hands-free radiotelephone having a speaker, a microphone coupled to a vocoder for generating codewords from a speech signal, and an acoustic echo canceller, the radiotelephone communicating over radio frequencies with a telephone switching network and having a forward communications path from the telephone switching network to the radiotelephone and a reverse communications path from the radiotelephone to the telephone switching network, the method comprising the steps of:
   determining if the speech signal is active on the forward communications path;
   if the speech signal is active on the forward communications path, calculating a threshold for acoustic echo codewords on the reverse communications path; and
   if the acoustic echo codewords on the reverse communications path have an amlitude less than the threshold, replacing the acoustic echo codewords with codewords representing an energy and spectral content of ambient noise.

3. The method of claim 2 wherein the threshold is calculated by subtracting attenuation due to the acoustic echo canceller from a difference of a dynamic range of the voice signal and attenuation from the speaker to the microphone.

* * * * *